(12) United States Patent
Nakagawa et al.

(10) Patent No.: US 9,969,309 B2
(45) Date of Patent: May 15, 2018

(54) VEHICLE SEAT

(71) Applicant: TOYOTA BOSHOKU KABUSHIKI KAISHA, Aichi-ken (JP)

(72) Inventors: Tetsuo Nakagawa, Aichi-Ken (JP); Shota Nonoyama, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days. days.

(21) Appl. No.: 14/694,548

(22) Filed: Apr. 23, 2015

(65) Prior Publication Data

US 2015/0307010 A1   Oct. 29, 2015

(30) Foreign Application Priority Data

Apr. 25, 2014  (JP) .................................. 2014-091081

(51) Int. Cl.
| | |
|---|---|
| *B60N 2/20* | (2006.01) |
| *B60N 2/68* | (2006.01) |
| *B60N 2/60* | (2006.01) |
| *B60N 2/16* | (2006.01) |

(52) U.S. Cl.
CPC .......... *B60N 2/682* (2013.01); *B60N 2/1615* (2013.01); *B60N 2/6009* (2013.01); *B60N 2/686* (2013.01)

(58) Field of Classification Search
CPC .... B60N 2/682; B60N 2/1615; B60N 2/6009; B60N 2/686
USPC ................. 297/452.58, 452.38, 463.1, 463.2
See application file for complete search history.

(56) References Cited

U.S. PATENT DOCUMENTS

| | | | | |
|---|---|---|---|---|
| 5,002,339 A | * | 3/1991 | Yamashita ............... | B60N 2/22 297/354.12 |
| 5,007,682 A | * | 4/1991 | Kuwabara ............... | B60N 2/44 297/452.38 |
| 5,288,133 A | * | 2/1994 | Mizushima .......... | B60N 2/0705 248/345.1 |

(Continued)

FOREIGN PATENT DOCUMENTS

| | | |
|---|---|---|
| CN | 102874202 | 1/2013 |
| JP | 63-155466 | 10/1988 |

(Continued)

OTHER PUBLICATIONS

Chinese Office Action for CN App. No. 201510201777.9 dated Nov. 2, 2016, along with an English-language translation thereof.

(Continued)

*Primary Examiner* — Syed A Islam
(74) *Attorney, Agent, or Firm* — Greenblum & Bernstein, P.L.C.

(57) ABSTRACT

A vehicle seat having a frame and a shield mounted thereto, wherein the frame has a hole portion or an insertion portion, the shield has an insertion part which is inserted into the hole portion or a hole part into which the insertion portion is inserted, the engaging portion of the shield engages with the engaged portion of the frame in a state where the infix portion is inserted into the cavity portion, and the cavity portion is arranged such that a direction in which the infix portion is inserted into the cavity portion is a direction intersected with the insertion direction of the insertion part relative to the hole portion or the direction intersected with the insertion direction of the insertion portion relative to the hole part.

6 Claims, 7 Drawing Sheets

(56) References Cited

U.S. PATENT DOCUMENTS

| | | | | |
|---|---|---|---|---|
| 6,149,241 A * | 11/2000 | Waku | ............... | B60N 2/015 |
| | | | | 297/452.38 |
| 7,237,846 B1 * | 7/2007 | Arima | ............... | B60N 2/6009 |
| | | | | 297/452.18 |
| 7,360,842 B2 * | 4/2008 | Sayed | ............... | B60N 2/22 |
| | | | | 297/452.38 |
| 8,353,561 B2 * | 1/2013 | Yamazaki | ............... | B60N 2/44 |
| | | | | 297/452.38 |
| 8,585,079 B2 * | 11/2013 | Gorman | ............... | B60R 21/207 |
| | | | | 280/728.2 |
| 8,662,589 B2 * | 3/2014 | Suzuki | ............... | B60N 2/12 |
| | | | | 297/378.12 |
| 8,678,506 B2 * | 3/2014 | Beneker | ............... | B60N 2/68 |
| | | | | 297/452.18 |
| 9,399,409 B2 * | 7/2016 | Rdzanek | ............... | B60N 2/02 |
| 2009/0146485 A1 * | 6/2009 | Inagaki | ............... | B60N 2/0224 |
| | | | | 297/463.1 |

FOREIGN PATENT DOCUMENTS

| | | |
|---|---|---|
| JP | 2-44534 | 3/1990 |
| JP | 2000-108732 | 4/2000 |
| JP | 2006-43307 | 2/2006 |
| JP | 2013-1149 | 1/2013 |

OTHER PUBLICATIONS

Office Action for Japanese Patent Application JP2014-091081 dated Jul. 11, 2017, along with English-language translation.

\* cited by examiner

VEHICLE SEAT

INCORPORATION BY REFERENCE

The disclosure of Japanese Patent Application No. 2014-091081 filed on Apr. 25, 2014 including the specification, drawings and abstract is incorporated herein by reference in its entirety.

BACKGROUND OF THE INVENTION

1. Field of the Invention

The invention relates to a vehicle seat. Particularly, it relates to a vehicle seat in which the frame making up a base body of the vehicle seat is mounted with a shield.

2. Description of Related Art

A shield has been mounted to a frame making up a base body of the vehicle seat. For example, Japanese Patent Application Publication No. 2013-1149 (JP2013-1149A) discloses that clips arranged on a shield are pressed into and engaged with the boss of the frame, whereby the shield is mounted to the frame.

However, when the vehicle seat is used, a situation where force is applied to the end portion of the shield will occur. In such a situation, the clips falls off the boss due to the application of force in the length direction thereof, and the shield may fall off the frame.

SUMMARY OF THE INVENTION

The invention is made in light of the above points, aiming to solve the problem of suppressing a shield from falling off a frame even if when load is applied to the end portion of the shield which is mounted on the frame of a vehicle seat.

An aspect of the invention relates to a vehicle seat having a frame and a shield mounted to the frame, wherein the frame has a hole portion or an insertion portion, the shield has an insertion part which is inserted into the hole portion or a hole part into which the insertion portion is inserted, an engaging portion of the shield and an engaged portion of the frame are engaged in the state where the infix portion is inserted into the cavity portion, and the cavity portion is arranged such that a direction in which the infix portion is inserted into the cavity portion is (i) a direction intersected with an insertion direction of the insertion part relative to the hole portion, or (ii) a direction intersected with an insertion direction of the insertion portion relative to the hole part.

According to the aspect of the invention, in the state where a shield is mounted to the frame, the cavity portion is arranged such that the infix portion is inserted along the direction not parallel to but intersected with the insertion direction of the insertion part relative to the hole portion or the insertion direction of the insertion portion relative to the hole part. For this reason, even if force is applied to the shield towards the direction opposite to the direction in which the insertion part or the insertion portion is inserted, the fall-off of the insertion portion from the hole part or the fall-off of the insertion part from the hole portion can be suppressed since the infix portion and the cavity portion are in an engagement state, such that the fall-off of the shield from the frame can also be suppressed.

In the aspect of the invention, at least the movement of the shield in either the backward direction or the downward direction of the seat may be suppressed by means of the engagement between the engaging portion and the engaged portion.

According to the aspect, at least the movement of the shield in either the backward direction or the downward direction can be suppressed by means of the engagement between the engaging portion and the engaged portion. When an occupant takes a seat or the like, the force applied from the occupant to the shield is mainly applied in the backward direction or downward direction, however, the force applied in the direction can be overcome so as to suppress the movement of the shield, and thereby can effectively suppress the movement of the shield.

In the aspect of the invention, the insertion direction may be the left-right direction of the seat, and the engaging portion may be arranged at a position closer to the front side than at least one insertion part or hole part and suppresses the movement of the shield in the backward direction of the seat.

According to the aspect, even for a shield which is inserted from the lateral side of the vehicle seat, it can overcome the force that enables the shield to move backwards. For this reason, the shield will not easily fall off the frame due to its backward movement will not occur easily, and the fall-off of the shield from the frame can be suppressed.

According to the aspect, the fall-off of the shield from the frame can be suppressed even if when load is applied to the end portion of the shield which is mounted on the frame of the vehicle seat.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
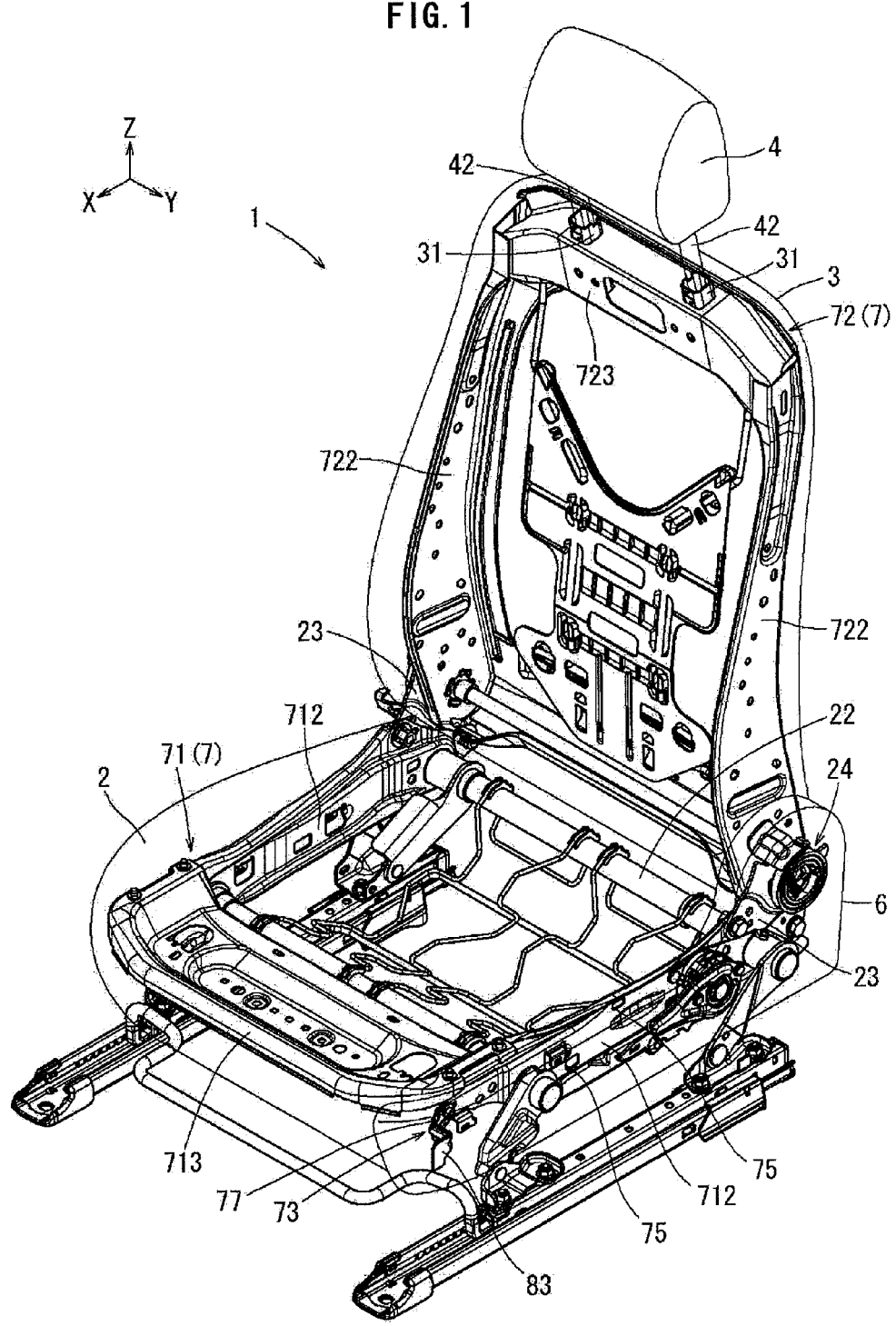
FIG. 1 is a stereoscopic view of the vehicle seat of an embodiment of the invention.

Embodiments of the invention will be described below by using the figures. One point to note is that: regarding the front-back direction, up-down direction, left-right direction and the like in the specification, X is defined as the front direction, Y is defined as the left direction, and Z is defined as the up direction as shown in the figures such as FIG. 1.

Vehicle seat 1 of the embodiment is particularly suitable for an automobile. Vehicle seat 1 has the following components: a seat cushion 2 having a supporting plane mainly facing the thighs of an occupant, a seatback 3 obliquely movable relative to the seat cushion 2 and having a supporting plane mainly facing the back of an occupant, and a headrest 4 connected to the seatback 3 and mainly facing the head of an occupant. Vehicle seat 1 has frames 7 making up the base body, wherein the frame 7 arranged on the seatback 3 is the back frame 72 and the frame 7 arranged on the seat cushion 2 is the cushion frame 71. A shield 6 made of resin is mounted relative to the frames 7, which can refrain the frames 7 from being observed from outside. It should be noted that, a flexible seat cushion (not shown) made of foamex and a seat cover (not shown) covering the outside of the seat cushion are provided around the frames 7 of the seat, which are constructed to appropriately support an occupant.

The back frame 72 is constructed to have a substantial U shape observed in a main view. The back frame 72 according to the embodiment has side frames 722 respectively arranged at the left and right sides and an upper frame 723 connected to the upper ends of the side frames 712. The upper frame 723 is fixed with a holder 31 capable of holding the headrest support member which is not shown and is constructed to fix the headrest 4 by inserting headrest stay 42 into the headrest support member.

The cushion frame 71 is constructed to have a substantial U shape in a top view. The cushion frame 71 in the embodiment has side frames 712 respectively arranged at the left and right sides and a front panel 713 connected to the front ends of the side frames 712. The side frames 712 are connected at the rear end sides thereof with a rear pipe 22, and the cushion frame 71 and the rear pipe 22 are arranged to form a substantial quadrilateral shape in a top view. The cushion frame 71 is connected at the rear end side thereof with reclining plates 23 and a reclining mechanism 24, so that the side frames 712 of the seat cushion 2 are connected with the side frames 722 of the seatback 3.

Figure 2:
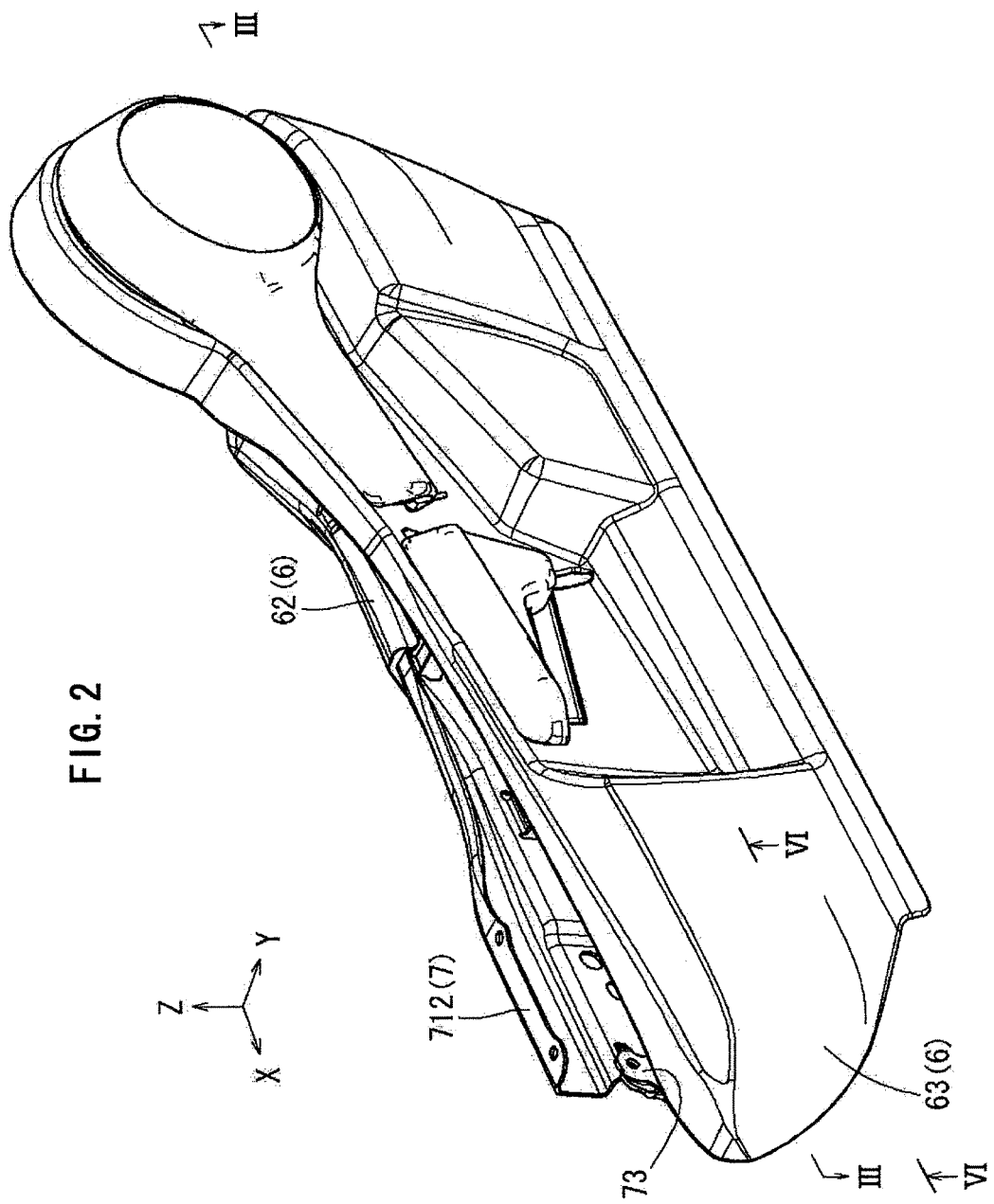
FIG. 2 is a stereoscopic view showing a state where the side frame of the vehicle seat is mounted with a shield.
Figure 3:
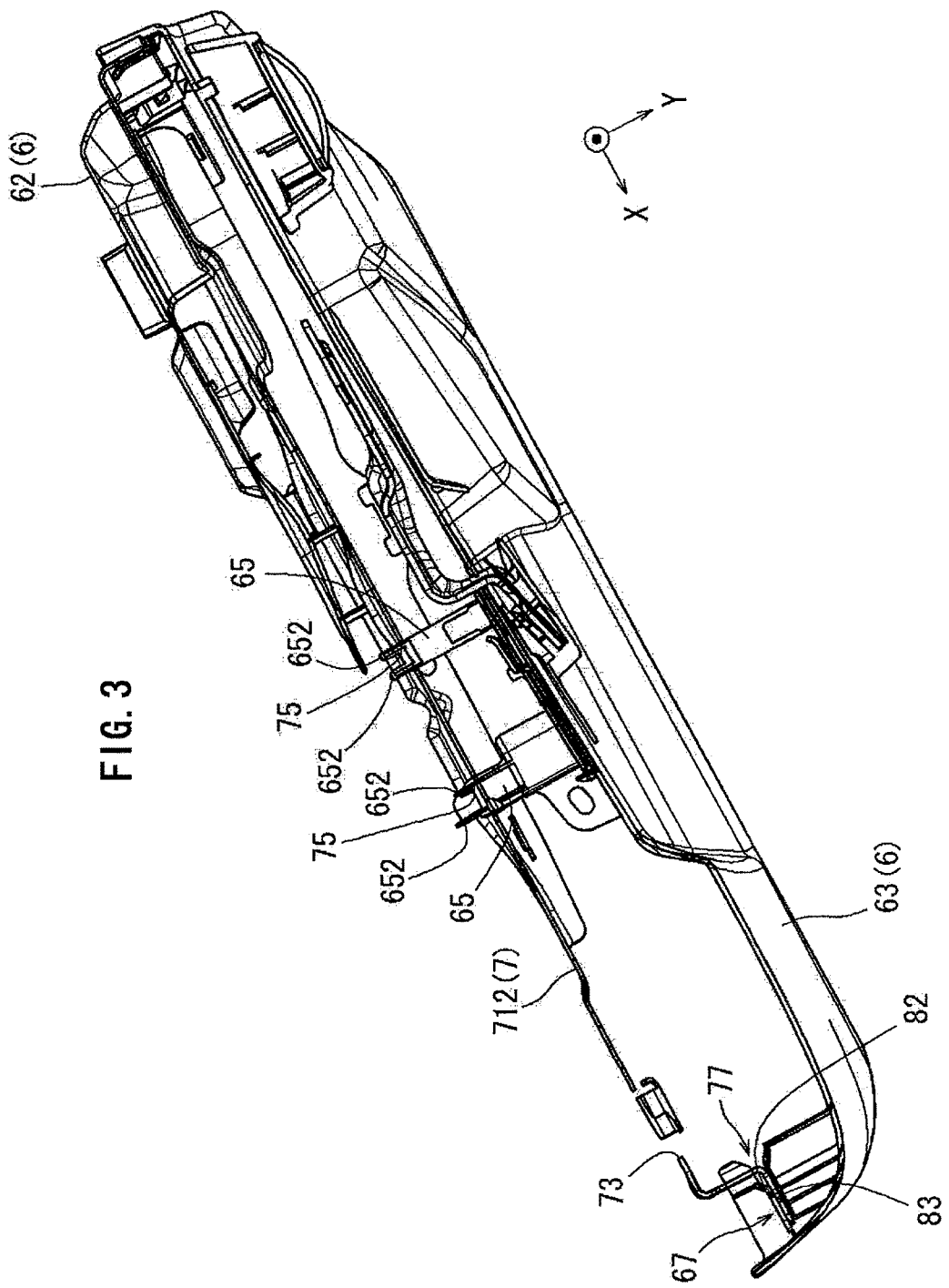
FIG. 3 is a III-III sectional view of FIG. 2.
Figure 4:
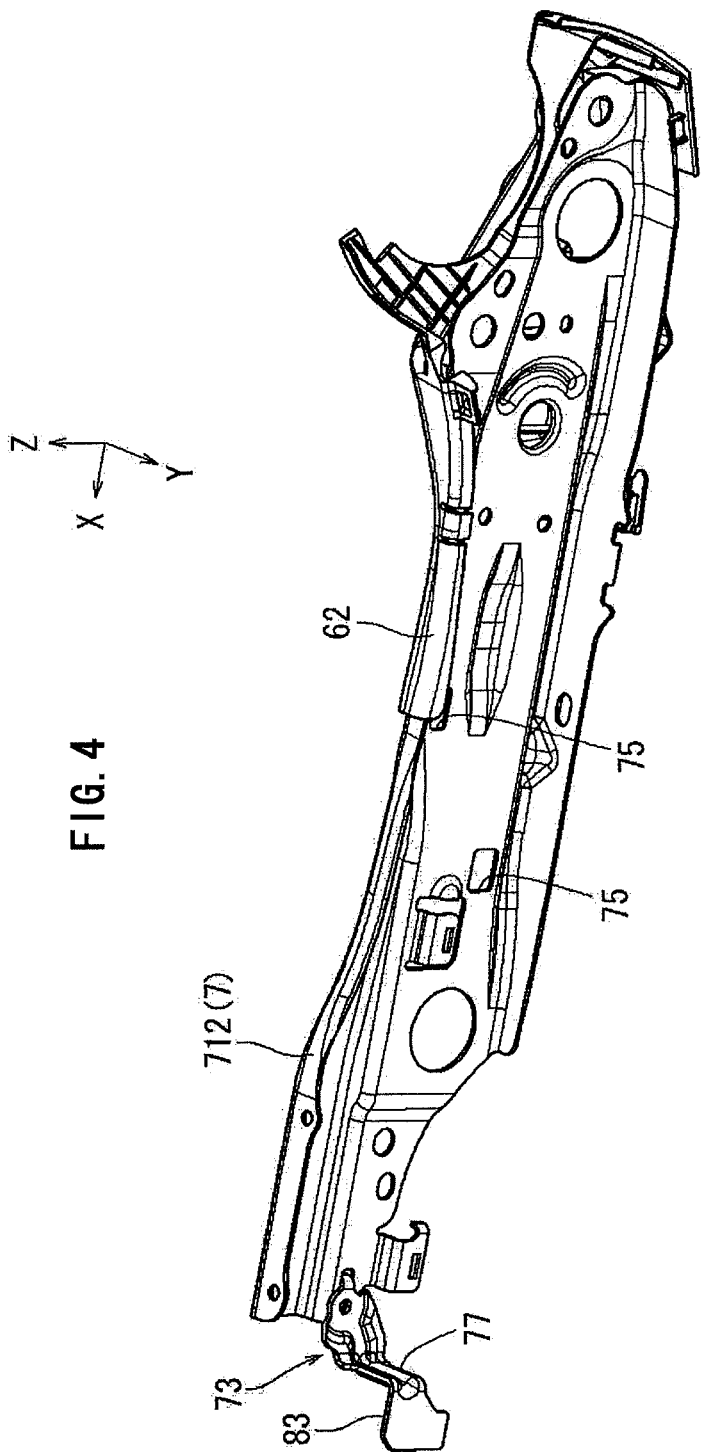
FIG. 4 is a stereoscopic view of a side frame which is mounted with a bracket and an inside shield.
Figure 5:
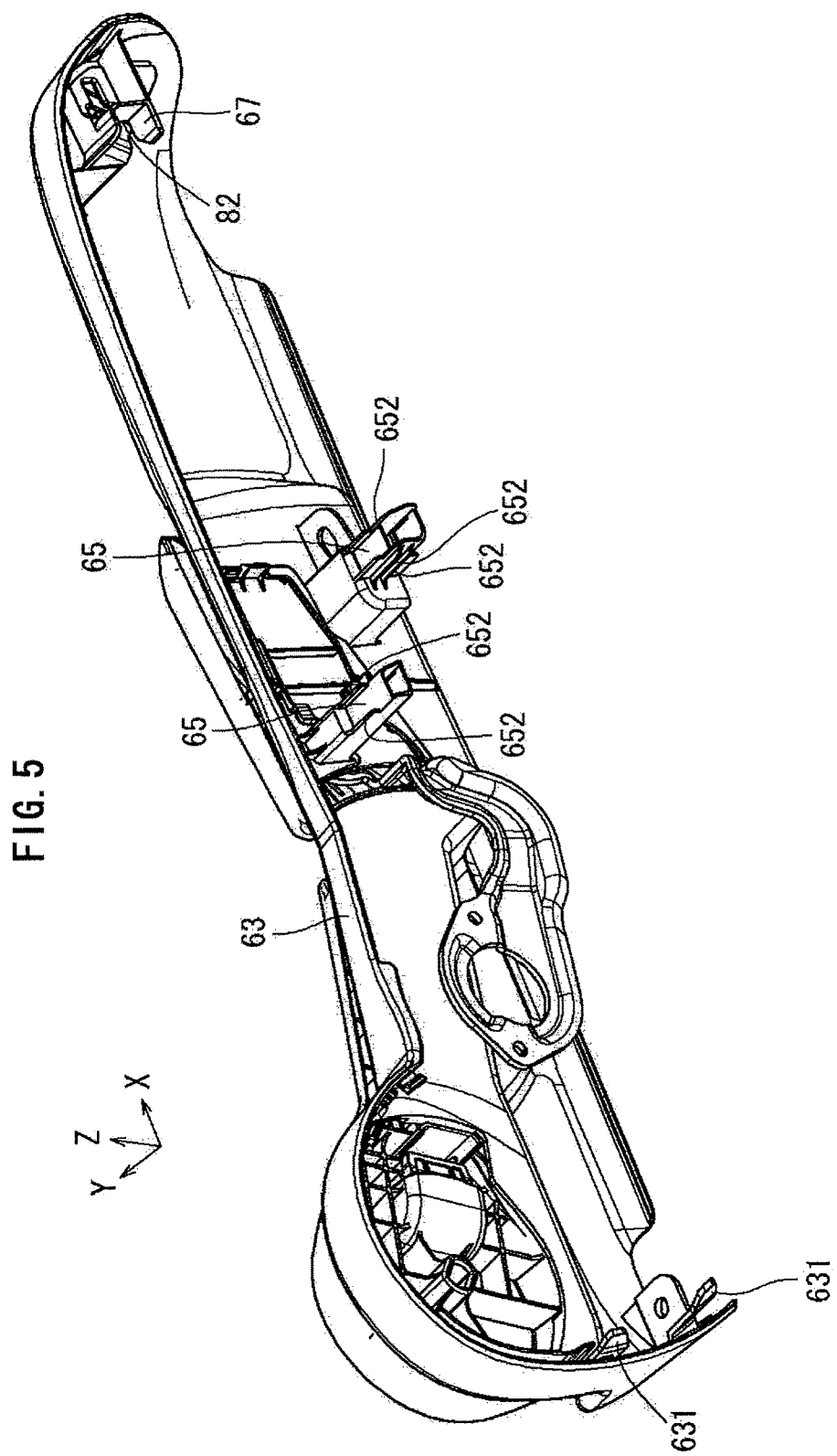
FIG. 5 is stereoscopic view showing the mounting surface (inside surface) of the shield.

In the embodiment, a shield 6 is attached to the side frames 712 of the seat cushion 2. As shown in FIGS. 2 and 3, the side frames 712 are mounted with two shields 6: an inside shield 62 which is mainly located at the internal side of the side frames 712, and an outside shield 63 which is located at the external side of the side frames 712. The description will be made below focusing on the relationship between the outside shield 63 and the frames 7. In the embodiment, the side frames 712 are provided with hole portions 75 (see FIG. 4) which are arranged to penetrate the side frames 712 along the left-right direction, and the outside shield 63 is provided with insertion parts 65 which can be embedded into the hole portions 75 (see FIGS. 3 and 5). The insertion parts 65 are formed in a cylindrical shape which protrudes from the outside shield 63. In the embodiment, the front ends of the insertion parts 65 have deformation portions 652 which can deform. The deformation portions 652 are formed in a plate shape and deform when the insertion parts 65 are inserted into the hole portions 75, such that the friction force between the hole portions 75 and the insertion parts 65 can be increased.

Figure 6:
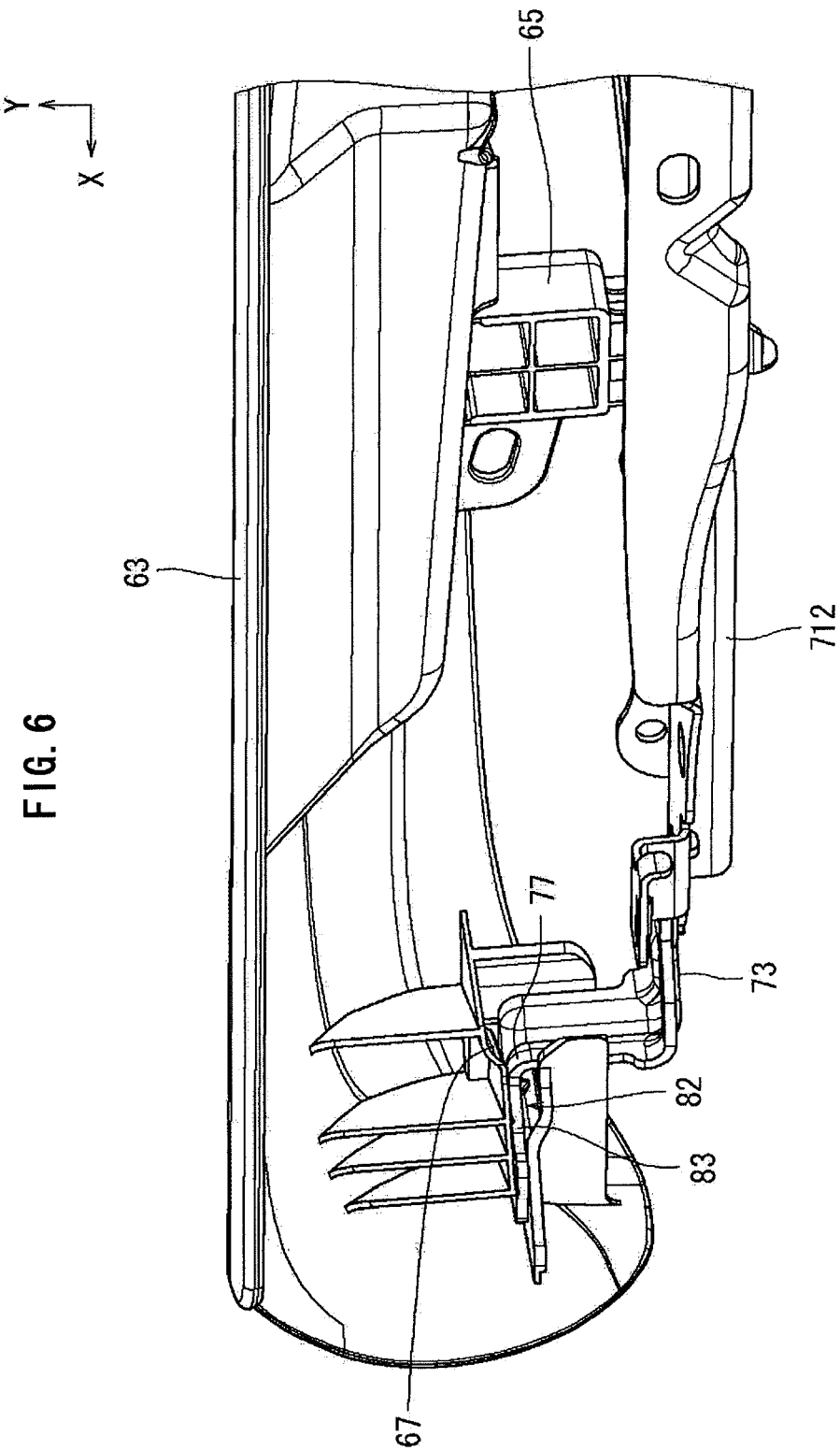
FIG. 6 is a locally enlarged view showing the state of the engagement between the engaging portion and the engaged portion, and is a VI-VI reference arrow view of FIG. 2.

In the embodiment, the outside shield 63 has an engaging portion 67, and the side frame 712 is provided with an engaged portion 77 which can engages with the engaging portion 67 (see FIGS. 3 and 6). Specifically, the engaged portion 77 is arranged by mounting a metal bracket 73 to the side frame 712. Furthermore, a concave cavity portion 82 is arranged in the outside shield 63 in a manner that the bracket 73 can abut against the concave cavity portion 82, so as to form an engaging portion 67. The cavity portion 82 is provided in the outside shield 63, and the bracket 73 fixed to the frame 7 can partially abut against the cavity portion 82 in an embedded state in which the bracket 72 is embedded in the cavity portion 82. In the embodiment, the cavity portion 82 is constructed in a manner such that the part having an L-shaped cross section can be inserted. The L-shaped part is an infix portion 83 which is inserted into the cavity portion 82 and can also suppress the upward and downward movements in a state where the infix portion 83 is inserted and is embedded into the cavity portion 82. As a result, by means of the engagement between the engaging portion 67 and the engaged portion 77, the movement of the shield 6 in the direction intersected with the insertion direction of the insertion parts 65 relative to the hole portions 75, i.e., with the left-right direction, is suppressed. Particularly, in the embodiment, the cavity portion 82 is arranged such that the infix portion 83 is inserted along a direction substantially orthogonal to the insertion direction of the insertion parts 65 relative to the hole portions.

In the state where the infix portion 83 formed at one end of the bracket 73 is inserted into the cavity portion 82, the parts of the outside shield 63 are adjacent to the front side, upper-lower sides, and the left-right sides of one end of the bracket 73 (see FIG. 6). For this reason, even if the shield 6 is to be moved backwards, the movement can also be suppressed by the parts of the outside shield 63 which is located at a position closer to the front side than one end of the bracket 73. Thereby, the force is prevented from acting on the insertion part 65 which is located at a position closer to the back side than the bracket 73, and the shield 6 is prevented from falling off the frame 7. Furthermore, even if the shield 6 is to be moved in a manner of separating from the frame 7, the movement can also be suppressed by the parts of the outside shield 63 which is located at the right side of the bracket 73. Moreover, even if the force acts downwards, the movement of the shield 6 can also be suppressed by abutting the bracket 73 against the parts at the upper side thereof. Such a situation is more effective by maintaining the state of the engagement between the engaging portion 67 and the engaged portion 77 which are located at the position closer to the border than the insertion part 65.

In the embodiment, the inside shield 62 made of resin arranged at the internal side of the frame 7 has a clipping part 621 which is arranged to extend along the left-right direction. The clipping part 621 can clip with the clipped part 631 arranged on the outside shield 63. In the embodiment, an opening 632 is arranged in the clipped part 631 so as to clip with a clipping pawl 622 arranged on the clipping portion 621 which is arranged at the back side of the inside shield 62. For this reason, in the outside shield 63, the engaging portion 67 arranged at the front side can engage with the engaged portion 77, and the clipped part 631 arranged at the back side can be clipped at the clipping part 621. The insertion parts 65 are arranged proximate to the center portion of the outside shield 63. Consequently, the outside shield 63 has insertion parts 65 between the engaging portion 67 and the clipped parts 631 (see FIG. 5).

Figure 7:
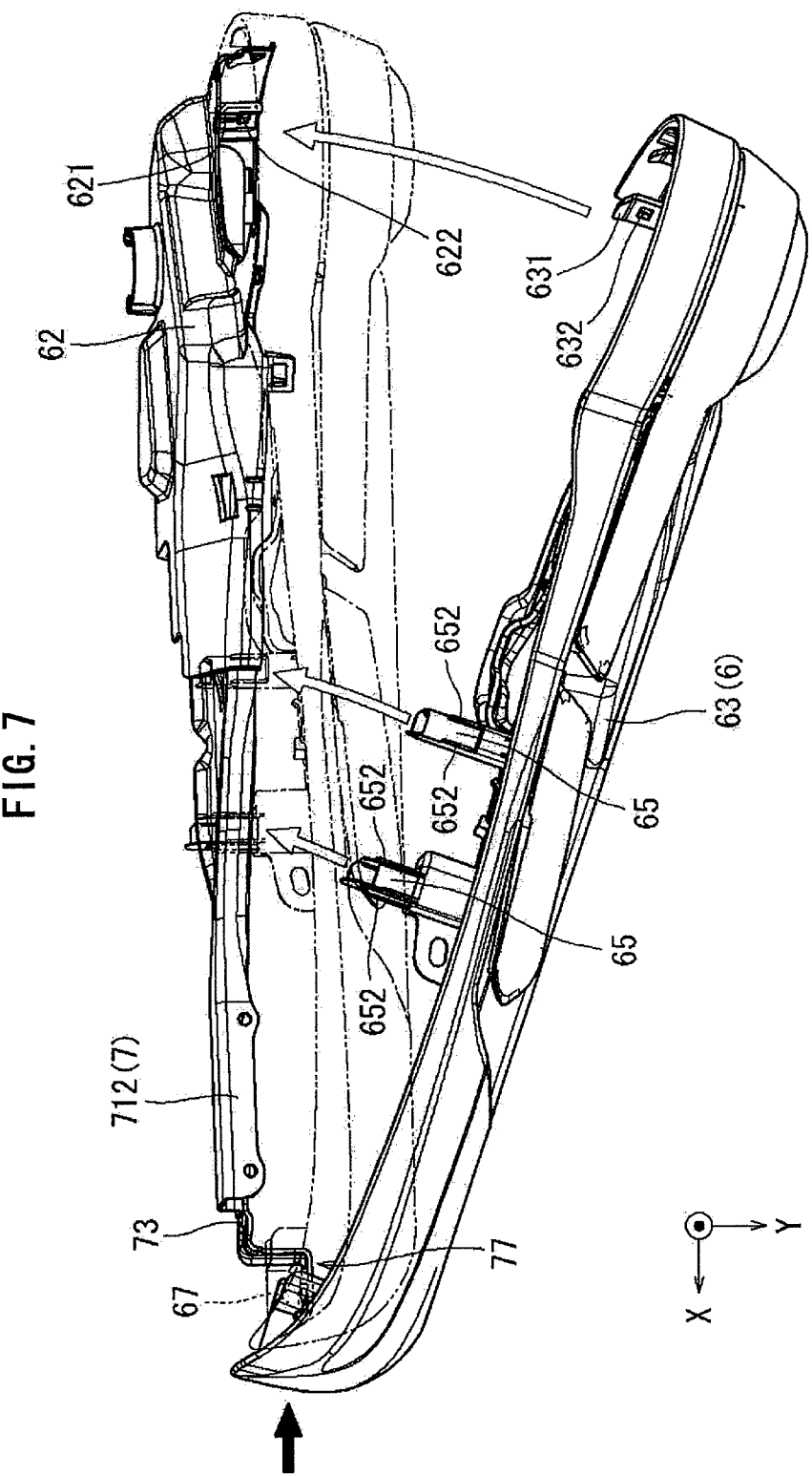
FIG. 7 is a top view showing the state with solid lines before a shield is mounted to the frame and showing the state with dash-and-dot twin point lines after a shield is mounted to the frame.

Methods for mounting the outside shield 63 to the side frame 712 according to the embodiment will be described below. First, a bracket 73 having a bending shape is mounted to the side frame 712. The bracket 73 is a step-shaped structure bent from a substantially long quadrilateral, flat plate, and the flat surface is mounted by abutting against the side frame 712. Besides, the bracket 73 is mounted in a manner that one end of the bracket 73 is located at a position closer to the external side than the side frame 712. The outside shield 63 is inserted into the plate at the front end of the bracket 73 by moving the outside shield 63 towards the black arrow direction as shown in FIG. 7. The outside shield 63 is formed with a cavity portion 82, which is arranged such that the bracket 73 can engage with the outside shield 63 by moving from the front to the back. The outside shield 63 is made of resin and has rigidity which enables the bracket 73 to tilt in the left-right direction in even a state where the bracket 73 is inserted into the cavity portion 82. Consequently, the hole portion 75 is arranged to separate from the insertion part 65 (see FIG. 7). From this state, the hole portion 75 is made to approach the insertion part 65 as indicated by the hollow arrow and the insertion part 65 is inserted into the hole portion 75. Up to this point, the outside shield 63 is moved rotatably by centering on the proximity of the cavity portion 82 to which a bracket 73 is inserted, such that the insertion part 65 is embedded into the hole portion 7. Finally, the clipped part 631 arranged at the back side of the outside shield 63 clips at the clipping portion 621 so as to complete mounting the outside shield 63.

Vehicle seat 1 according to the embodiment has a frame 7 and a shield 6 mounted to the frame 7, wherein the frame 7 has a hole portion 75, the shield 6 has an insertion part 65 which is inserted into the hole portion 75, the engaging portion 67 of the shield 6 engages with the engaged portion 77 of the frame 7 in a state where the infix portion 83 is inserted into the cavity portion 82, and the cavity portion 82 is arranged to insert the infix portion 83 in the direction intersected with the insertion direction of the insertion part 65 relative to the hole portion 75. For this reason, even if force is applied to the shield 6 towards the direction opposite to the direction in which the insertion part 65 is inserted, the fall-off of the insertion part 65 from the hole portion 75 can be suppressed because the infix portion 83 engages with the cavity portion 82, such that the fall-off of the shield 6 from the frame 7 can also be suppressed.

In addition, vehicle seat 1 according to the embodiment at least can suppress the movement of the shield 6 in either the backward direction or downward direction the engaging portion 67 engages with the engaged portion 77. When an occupant takes a seat or the like, the force applied from the occupant to the shield 6 is mainly applied in the backward direction or downward direction; however, the force applied in the direction can be overcome so as to suppress the movement of the shield 6, and thereby can effectively suppress the movement of the shield 6.

In addition, vehicle seat 1 according to the embodiment sets the insertion direction as the left-right direction, and the engaging portion 67 is arranged at a position closer to the front side than at least one insertion part 65 and can suppress the movement of the shield 6 in the backward direction. That is, even for a shield 6 which is inserted from the lateral side of the vehicle seat 1, it can overcome the force that enables the shield 6 to move backward. For this reason, the shield 6 will not easily fall off the frame because the shield 6 moves in the backward direction, and the fall-off of the shield 6 from the frame 7 can be suppressed.

In addition, in the embodiment, if the outside shield 63 is to be embedded into the side frame 712 after the front end of the bracket 73 is inserted into the outside shield 63, the mounting of the outside shield 63 to the side frame 712 is completed. That is, the outside shield 63 is mounted to the side frame 712 without using a threaded member, and thus the outside shield 63 can be mounted to the side frame 712 without using a tool. Consequently, the operation of mounting the outside shield 63 to the side frame 712 is easier.

In addition, in the embodiment, to move the outside shield 63 rotatably in a state where the infix portion 83 is inserted into the cavity portion 82, the position at which the engaging portion 67 engages with the engaged portion 77 can serve as the rotating center. Consequently, the insertion part 65 can be inserted into the cavity portion 82 nearly without taking account into the positions of the insertion part 65 and the cavity portion 82, and the mounting operation is easier.

In addition, in the embodiment, the infix portion 83 is formed by bending the plate-shaped member. As a result, the area that bears the load applied to the outside shield 63 can be made larger such that the stability of the outside shield 63 can be improved. Furthermore, the infix portion 83 is made to be wider than the mounting portion with the side frame 712, so as to suppress the increase of weight and achieve the stabilization of the outside shield 63.

Description has been made as above using one embodiment. However, the invention can be carried out in other various embodiments besides the above embodiment. For example, as for the shield that covers the frame of the seatback, it is also applicable to the invention. Furthermore, the cavity portion can be arranged above or below the insertion part, as well as at the rear thereof. That is, the cavity portion can be arranged at any position as long as the function thereof can be performed, but it is preferably arranged at a location where loads can be easily applied or where the cavity portion can be accurately aligned. Consequently, the cavity portion is preferably arranged in front of the insertion part or above the insertion part as described in the embodiment.

In addition, it may not be a structure where the insertion part is arranged in the shield and the hole portion is arranged in the frame, but a structure where the hole part is arranged in the shield and the insertion portion is arranged in the frame. Furthermore, a shield may have an infix portion and a cavity portion is arranged in the frame. In such a situation, the structure that can suppress the force applied at the end of the shield from being delivered to the insertion part and the like is preferably engaged.

In the embodiment, since the infix portion is inserted only to the cavity portion, the insertion-in and pull-out of the infix portion relative to the cavity portion can be easily performed. In a situation where there is fear that the infix portion may fall off the cavity portion, a structure that can suppress the infix portion from moving in a direction opposite to the insertion direction may be formed. For example, a pawl which protrudes towards the thickness direction of the bracket is provided, and is hanged in a pawl receiving groove arranged in the shield, whereby falling of the infix portion off the cavity portion due to its movement can be suppressed.

In addition, the engagement between the engaging portion and the engaged portion does not have to be constructed by abutting the bracket against the shield, and may be constructed by abutting the frame against the shield. In such a situation, the structure where the movement of the shield can be suppressed by embedding the frame into the cavity portion arranged in a shield is preferably formed.

In addition, the shield is not limited to a shield which only covers the left side surface or the right side surface, and a U-shaped shield in a top view may be constructed to cover the front surface as well as the left and right side surfaces. Furthermore, a front shield which only covers the front surface of a vehicle seat is also applicable to the invention.

In addition, the number of insertion portions does not have to be two, and may be set as one, or three or more. Whether in the situation of one or the situation of more than three, the insertion portions are preferably arranged proximate to the center of the shield in the length direction. Regarding the cavity portions, the number thereof does not have to be one and may be set as two or three or more.

In addition, the vehicle is not limited to an automobile, and it may be a vehicle flying in the sky such as an airplane or a helicopter, or a vehicle moving on the sea surface or in the sea such as a ship or a submarine.

What is claimed is:

1. A vehicle seat comprising: a frame; and a shield mounted to the frame, wherein the frame has one of a hole or an insertion portion, the shield has one of an insertion part which is inserted into the hole or a hole part into which the insertion portion is inserted, an engaging portion of the shield has one of a cavity portion and an infix portion, and an engaged portion of the frame has the other of the one of the cavity portion and the infix portion, the engaging portion engages the engaged portion in a state where the infix portion is inserted into the cavity portion, the cavity portion is arranged such that a direction in which the infix portion is inserted into the cavity portion is one of: (i) a direction intersected with an insertion direction of the insertion part relative to the hole, or (ii) a direction intersected with an insertion direction of the insertion portion relative to the hole part, and during an engagement of the shield to the frame, the shield rotates about the one of the cavity portion and infix portion such that the one of the insertion part or the hole part of the shield is inserted into or receives the one of the hole or the insertion portion of the frame.

2. The vehicle seat according to claim 1, wherein
   at least a movement of the shield in either a backward direction or a downward direction of the seat is suppressed by the engagement between the engaging portion and the engaged portion.

3. The vehicle seat according to claim 1, wherein the insertion direction of the insertion part and the insertion portion is a left-right direction of the vehicle seat, and the engaging portion is arranged closer to the front side of the shield than the one of the insertion part or the hole part to suppress a movement of the shield in a backward direction of the vehicle seat.

4. The vehicle seat according to claim 3, wherein
   the insertion part has at a leading end thereof a deformation portion.

5. The vehicle seat according to claim 1, wherein
   the direction in which the infix portion is inserted into the cavity portion is along a front-rear direction of the vehicle seat, and
   wherein the insertion direction of the one of the insertion part relative to the hole or the insertion portion relative to the hole part is along a right-left direction of the vehicle seat such that the direction in which the infix portion is inserted into the cavity portion is generally perpendicular to the insertion direction the one of the insertion part relative to the hole or the insertion portion relative to the hole part.

6. The vehicle seat according to claim 1, wherein the infix portion is provided on the frame and the cavity portion is provided on the shield, the frame is a base body and the shield is a cover for the base body, and the base body is generally made of metal and the cover is generally made of resin such that the infix portion is made of metal and the cavity portion is made of resin.

* * * * *